United States Patent [19]

Wiedemann

[11] Patent Number: 4,906,097
[45] Date of Patent: Mar. 6, 1990

[54] IMAGING AND INSPECTION APPARATUS AND METHOD

[75] Inventor: Rudolf A. Wiedemann, Sunnyvale, Calif.

[73] Assignee: Lasersense, Inc., Santa Clara, Calif.

[21] Appl. No.: 179,641

[22] Filed: Apr. 8, 1988

Related U.S. Application Data

[63] Continuation-in-part of Ser. No. 120,130, Nov. 13, 1987, Pat. No. 4,856,902.

[51] Int. Cl.⁴ ............................................. G01B 11/00
[52] U.S. Cl. .................................................. 356/375
[58] Field of Search ............... 356/372, 373, 375, 384, 356/385, 386, 387, 394, 237; 250/202, 203, 559, 560, 561

[56] References Cited

U.S. PATENT DOCUMENTS

| | | | |
|---|---|---|---|
| 3,435,232 | 3/1969 | Sorenson | 250/203 |
| 3,856,412 | 12/1974 | Zanoni | 356/167 |
| 3,879,131 | 4/1975 | Cuthbert et al. | 356/106 |
| 4,201,476 | 5/1980 | Musto | 356/160 |
| 4,272,190 | 6/1981 | Shapiro | 356/124 |
| 4,384,195 | 5/1983 | Nosler | 377/53 |
| 4,422,763 | 12/1983 | Kleinknecht | 356/356 |
| 4,427,296 | 1/1984 | Demarest et al. | 356/387 |
| 4,433,912 | 2/1984 | Schwartz | 250/202 |
| 4,547,895 | 10/1985 | Mita et al. | 356/384 |
| 4,583,854 | 4/1986 | Lozar | 356/237 |
| 4,597,668 | 7/1986 | Ono | 356/372 |
| 4,624,563 | 11/1986 | Johnson | 356/152 |

Primary Examiner—F. L. Evans
Attorney, Agent, or Firm—A. C. Smith

[57] ABSTRACT

The improved method and means for detecting the edges of a sample part operates on the Gaussian distribution of light intensity across a laser beam and uses analog signal and simple logical circuits to produce highly accurate, highly repeatable and rapid edge position indications. A multi-segment detector is configured with reference to the dimensions of the laser beam to provide independent outputs representative of relative position of the reflected or transmitted portion of the laser beam upon the detector as the edge of the sample part moves across the beam. An improved detector for operation with a beam having non-uniform intensity distribution thereacross includes a central segment and four perimeter segments oriented about othogonal axes that are substantially aligned with the axes of movement of the sample part across the beam. Detection of angular orientation of the edge is determined by processing the response levels of the detector segments at edge crossing of an orthogonal axis with which the segments are aligned. Angular orientation of an edge relative to the orthogonal axes is determined at the edge crossing condition by processing the response levels of diametrically-oriented detector segments.

18 Claims, 9 Drawing Sheets

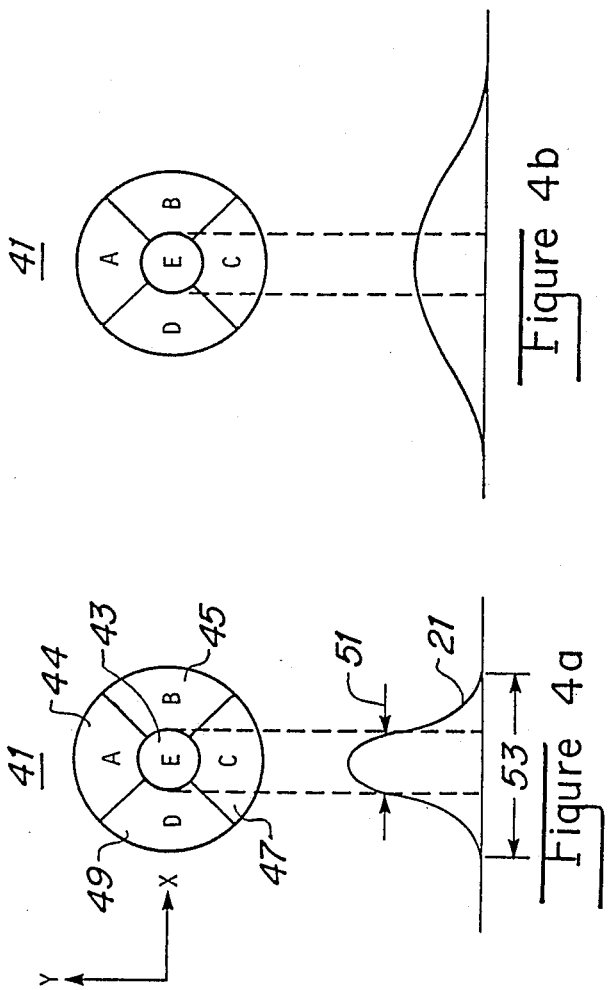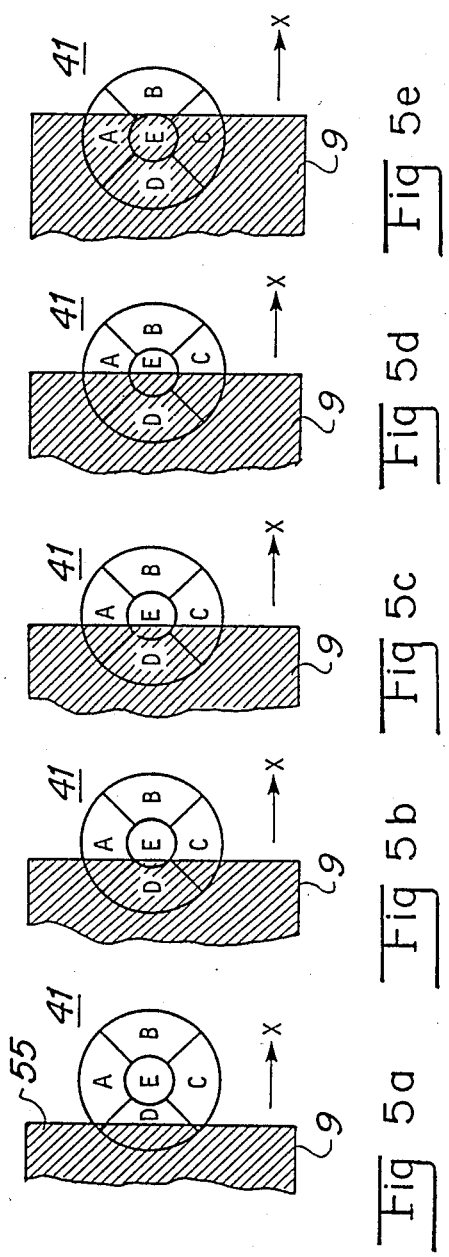

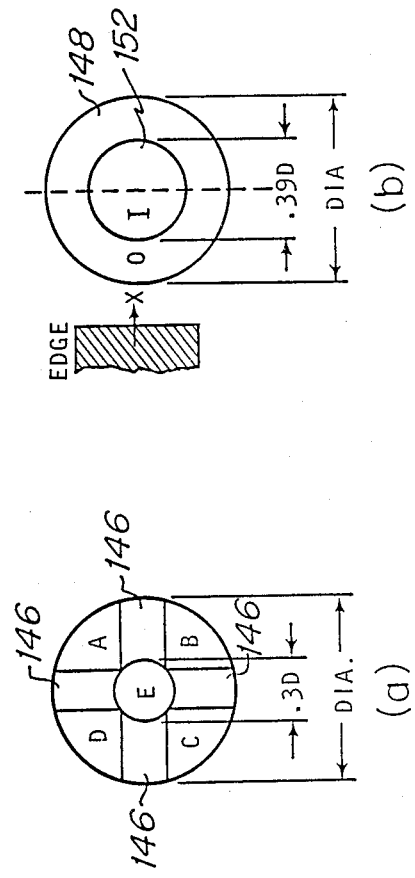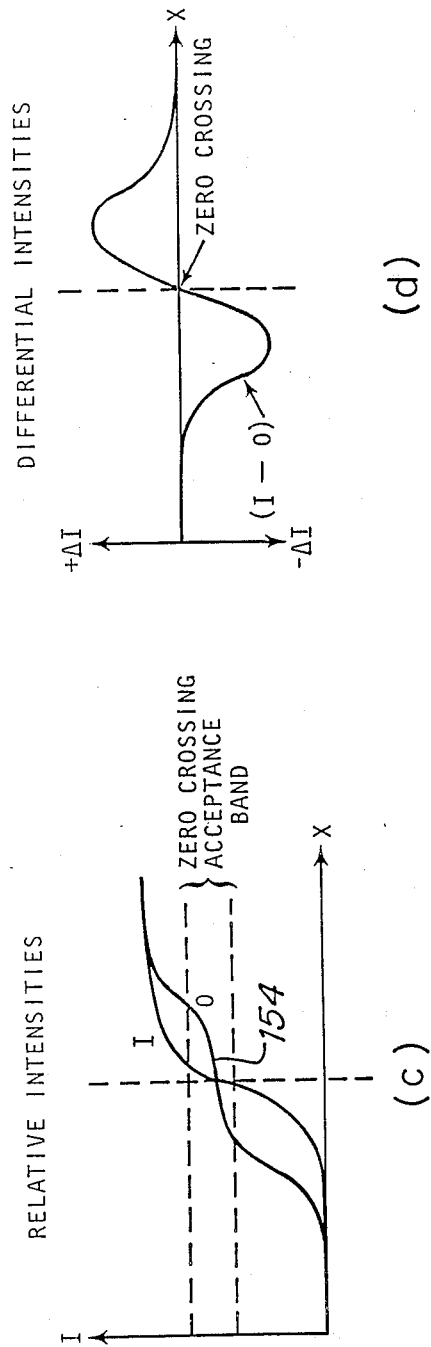
Figure 10

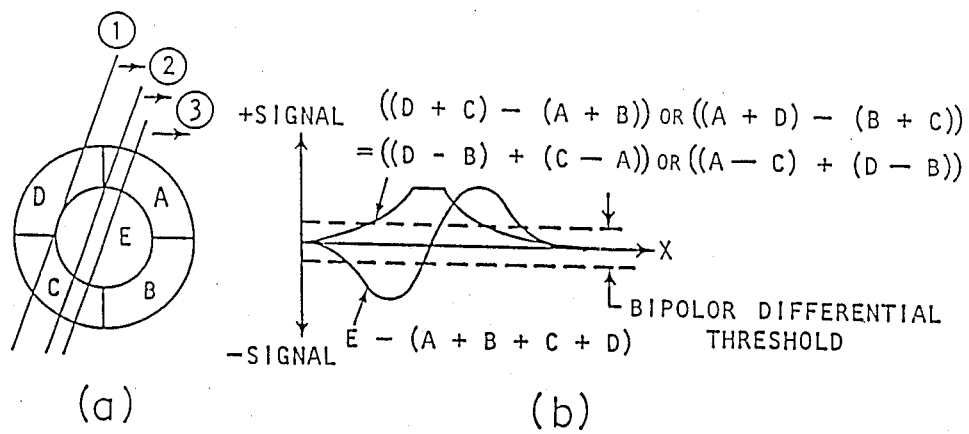
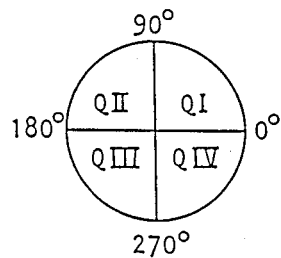
Figure 11
Figure 12
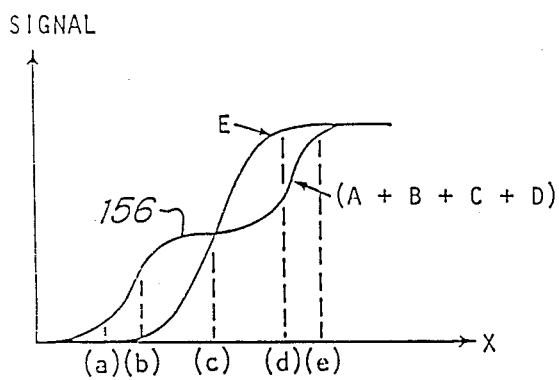
Figure 14
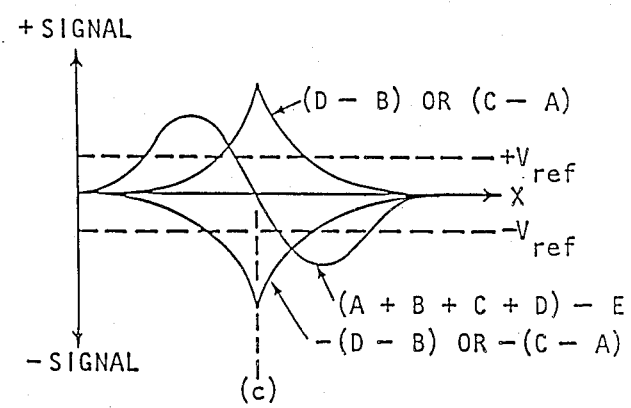
Figure 15

IMAGING AND INSPECTION APPARATUS AND METHOD

Related Applications

This application is a continuation-in-part application of pending application Ser. No. 120,130, entitled "Imaging And Inspection Apparatus And Method", filed on Nov. 13, 1987 by Rudolf A. Wiedemann, now U.S. Pat. No. 4,856,902.

BACKGROUND OF THE INVENTION

Field of Invention

This invention relates to object inspection techniques, and more particularly to optical apparatus and method for detecting edges of parts or objects with high precision and repeatability.

One basis for measuring the dimensions of a part or object is finding suitable edges or surfaces accurately and repeatably. Many parts are contact-sensitive or moving too fast in automated handling for contact methods. For low-cost manual operations, this is usually accomplished with a microscope having calibrated cross-hairs in the eyepiece. The operator judges the location of the edges of the part and then aligns the cross-hairs with such edges in order to read the dimension. This labor-intensive process is subjective and susceptible to operator fatigue and variances.

Certain known automated measuring techniques use a video camera in conjunction with the microscope. An electronic "hairline" along with computer image enhancement assists the operator in the measurement process but usually cannot find the edges without operator assistance. Systems of this type having edge-finding capabilities typically cost over $50,000, are fairly slow, and usually are limited to use in the metrology laboratory rather than on the production floor where such capability is needed.

The current trend is toward integrating the design, manufacture and inspection of parts under fully automated control using Computer Aided Engineering (CAE), Computer Aided Design/Drafting (CADD), Computer Aided Manufacturing (CAM), and Computer Aided Inspection (CAI). Much progress has been made in all but the last area. Coordinate Measuring Machines (CMMs) are available which can automatically measure parts in an inspection laboratory environment, but because of their size and cost, such machines have not been effectively integrated into the manufacturing process. Measurements of this kind are almost exclusively done in the metrology laboratory in which the environment can be controlled, but which is usually remotely located with respect to the fabrication site.

Automated Optical Inspection (AOI) is a desirable "in-process" method of inspection in automated manufacturing that can remove the subjectivity of set-up and inspections during fabrication while allowing corrections of measurement parameters to be made immediately, resulting in more precise parts at higher yields in less time. Because AOI is an optical, non-contact technique, it removes many of the speed and part accessibility limits usually encountered in conventional measuring techniques and provides precision and accuracy previously unattainable, for example, with contact inspection techniques. Various optical, non-contacting measuring and inspection schemes are described in the literature (see, for example, U.S. Pat. Nos. 4,422,763; 4,384,195; 4,583,854; 3,879,131; 4,201,476; 3,856,412; 4,272,190; 4,597,668; 4,624,563; and 4,427,296).

Optical measurement techniques are ideally suited for high-speed, precision fabrication of metal parts, electronic assemblies, semiconductor components, and for numerous other manufacturing tasks such as alignment, inspection, tracking, and the like, within diverse segments of commerce. For example, measurement microscopes as described in the literature, are commonly used in the inspection or alignment of small and delicate parts. They are often equipped with "encoders" which precisely display the position of a part with respect to the cross-hairs seen through the eyepiece. A camera port is typically used to mount a video camera which aids the operator in the inspection process. Because these camera ports are well-standardized, any instrument with such a feature can support a variety of accessories, including an edge-finding accessory of the type later described herein. Also, in the electronics industry there are numerous measurement and alignment techniques employed at all stages of circuit chip and circuit board fabrication. Many of these techniques use video-based inspection equipment in which the accuracy is limited to the field of view of the microscope and camera combination. In addition, robotic arms used in production applications commonly reference an edge or measure where a sample edge is located. In one such application, a robotic arm may be controlled to lay down a bead of weld along a seam and in another application a robotic arm may be coordinated with a measuring machine to inspect parts for dimensional accuracy. These and other such applications usually require the ability to detect an edge from light reflected from the object rather than from light passed through the object.

SUMMARY OF THE INVENTION

In accordance with the present invention, an improved edge-detecting method and apparatus includes a laser for producing a specially-formatted beam, a microscope-type optical system, and a segmented detector for locating the edges of parts or objects with high precision and repeatability and without the interpolative error between data bits commonly associated with digital systems. The laser provides a very high concentration of light in a well-controlled zone for high inspection sensitivity. This zone is a constant percentage of the field of view, regardless of the power of the objective lens in the optical system. That is, the spot size of the beam in the field of view is not dependent upon objective magnification. This zone also provides a "smoothing" effect over rough edges when viewed at high magnification. The accuracy and resolution increases as the power of the objective increases and the area of the laser beam at the sample decreases. The laser beam exhibits peak power or intensity at its center which is utilized to provide maximum signal change as an edge under inspection crosses the center of the beam. Its single wavelength allows viewing of the part or object under ambient light which will not affect the precision of the edge detector. The detector according to the present invention includes a pattern of active elements which provide electrical signals that represent the portion of the beam reflected back through the optical system from the sample part. The pattern of active elements makes maximum use of the laser beam intensity profile for enhanced sensitivity to movement of reflective edges. Since the present invention spatially integrates the beam power over the dimensions of the beam, the the effects of rough edges and surfaces tend to be averaged or smoothed out. Analog electronics decode the detector signals into virtual digital "on//-off" output when either a vertical or horizontal edge condition is detected that matches established signal limits. The detector and electronics can sense edges along X and Y axes independently and simultaneously. The analog circuitry is not computationally limited and permits edge detection in less than 1 microsecond for measurements "on-the-fly" at rates of movement of the sample parts of more than 1 meter/second. The method and apparatus of the present invention tolerates changes in distance from the objective lens to the sample part, but there are trade-offs between edge-finding resolution and depth-of-focus that depend upon the magnifying power of the objective lens. An "autofocus" system may be provided to maintain optimal working distance and to provide proximity measurement capability as well. As the contrast ratio between reflections received from sample parts and the background beyond the edge diminishes below limits, an indicator of insufficient contrasts is provided to advise the operator that measurement under these conditions may have poor measurement accuracy.

For sample parts on which surfaces and edges are either rounded, beveled or rough, such conditions can present problems if the geometry of the edge features are a large fraction of the radius of the laser beam. The operator is alerted that, for this type of edge, the magnifying power of the objective lens should be reduced in order to capture more of the edge within the beam zone (with slightly lower edge-finding resolution and repeatability). Of course, the spot size of the beam may be changed by conventional "zoom"-type optics. In the embodiment of the present invention, the beam location is fixed and the sample part is moved around under the measurement lens of the optical system. The edge positions thus accurately determined yield the distance or measurement between edges as a function of the translations of the supporting stage, and encoders coupled to the supporting stage provide the indication of the dimensions of a sample part between detected edges. Sample parts being sensed in sequence should, of course, be separated by at least one spot-size diameter for unambiguous detection. The present invention can thus form an integral part of an inspection system or process-control scheme in which the precise detection of an edge is essential.

DESCRIPTION OF THE DRAWINGS

FIGS. 4(a) and (b) are pictorial diagrams of the pattern of active segments in the embodiment of a detector according to the present invention;

FIGS. 5(a) through (e) are pictorial representations of the detector in spatial relationship to the edge of an ensuing reflective part or object;

FIGS. 10(a) and (b) are alternative embodiments of detectors according to the present invention, and FIGS. 10(c) and (d) are graphs of beam intensities detected by the detector of FIG. 10(b);

FIGS. 11(a) and (b) are, respectively, an embodiment of a detector showing an edge moving thereacross, and a graph illustrating signal conditions in the operation of the detector of FIG. 11(a) according to the present invention;

FIG. 12 is a diagram illustrating the orientation of quadrants in which outer segments of the detector are situated;

FIG. 14 is a graph illustrating the signal conditions in the operation of the detector of FIG. 13 on an orthogonally-oriented edge moving thereacross; and FIG. 15 is a graph illustrating the signal conditions during operation of the detector in the conditions illustrated in FIGS. 13(a) through (e).

DESCRIPTION OF THE PREFERRED EMBODIMENT

Figure 1:
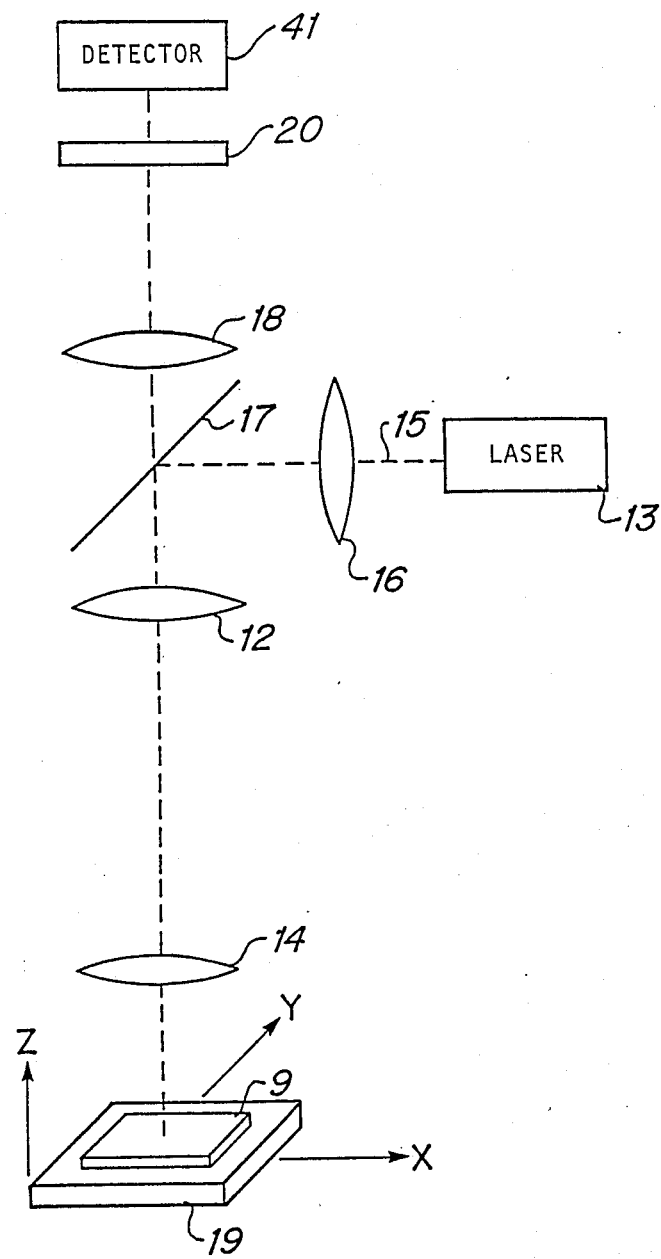
FIG. 1 is a pictorial diagram of the optical system according to one embodiment of the present invention.

Referring now to FIG. 1, there is shown a simplified pictorial diagram of an optical system according to one embodiment of the present invention in which the portion of a laser beam reflected from a sample part or object 9 is received by an optical sensor or detector 41. Specifically, a continuous-wave He Ne gas laser 13 is disposed to supply a laser beam 15 through a beam-formatting lens 16 to an optical beam splitter 17 (e.g., half-mirrored surface) for deflection through relay more lens 12 and objective lens 14 toward the sample 9 which is oriented to move on a supporting stage 19 for movement along orthogonally-oriented X and Y axes. Suitable encoders of conventional design (not shown) may be linked to the stage to indicate (electrically or mechanically) the movement of the stage 19 along respective axes in traversing the distances between sets of edges of the sample part 9. The reflected beam from sample part 9 passes through the beam splitter 17 and imaging lens 18 and transmission filter 20 to the detector 41. The transmission filter 20 may be interposed to limit the transmission of light to only the wavelength of laser 13. The combination of the relay lens 12 and the formatting lens 16 provide constant spot size as a percentage of field given regardless of objective lens 14 magnification.

Figure 2:
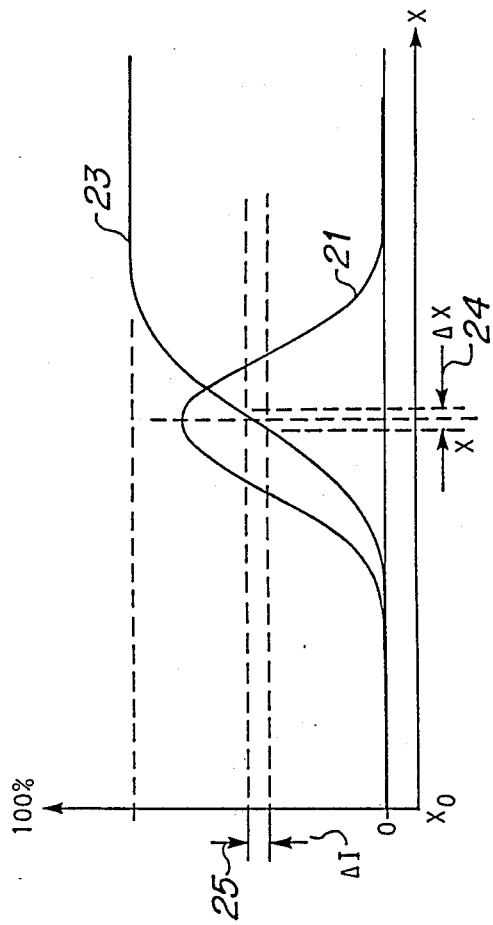
FIG. 2 is a graph illustrating the Gaussian distribution of power or intensity across the diameter of the laser beam.
Figure 3:
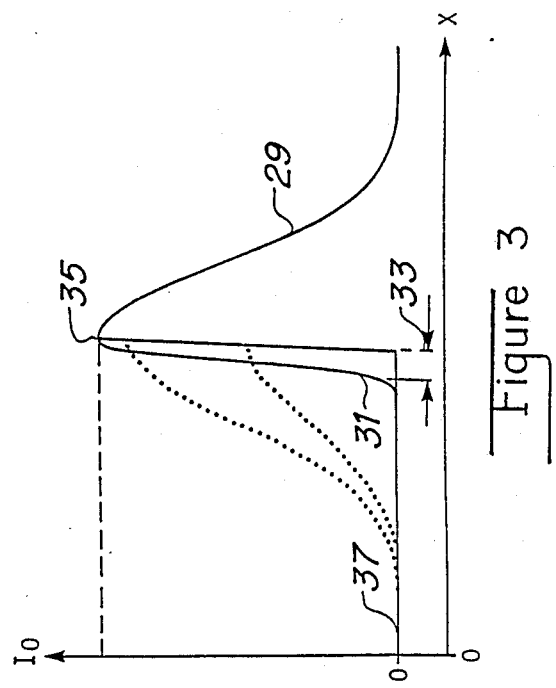
FIG. 3 is a graph illustrating the distribution of power or intensity of a laser beam reflected from near an edge or surface discontinuity.

The beam 15 from laser 13 has a substantially Gaussian power density or intensity distribution with distance across the dimension thereof, as illustrated by the curve 21 of FIG. 2. It should be noted that this power density distribution is substantially symmetrical with a peak of intensity near the center of the curve. Also, it should be noted that the integral with distance of the power density distribution across the laser beam (illustrated by curve 23 on a different vertical scale in FIG. 2) has a maximum rate of change, or slope, at the center peak. This maximum rate of change of the integrated power density across the laser beam is utilized in the present invention to provide precision edge detection of a sample part within narrow limits 25 of electrical noise, switching delays, and the like, and with highest sensitivity to positional change across the center of the beam, and this translates to narrow limits of position error 24 within the central area of the laser beam 15. If such laser beam 15 is supplied to a sample part at an edge thereof, then the power density distribution across the beam (reflected or transmitted) on opposite sides of an edge of the part centered in the beam would appear as illustrated in FIG. 3. Specifically, the curve 29 of FIG. 3 illustrates the reflected or transmitted power density distribution across an edge (which is at least longer than the diameter of the beam), and illustrates the maximum differential intensity across the edge of the sample as an indication of the contrast ratios present across an edge. Where an edge of a sample part is rolled or rough or not straight, the graph of contrast ratio across the edge will not appear as a disfunctional curve 29 but rather will appear as a continuous curve with distinct upper and lower inflection points in a wider region of transition over X distance 33 from the peak intensity 35 to the reference level 37 of no reflection or no transmission. Thus, the differences between the power densities in a laser beam on opposite sides of an edge as the edge of the sample part moves through the beam establish high contrast ratios across the edge. It can be shown that the slope or rate of change of differences of power densities on opposite sides of an edge diminishes with diminished contrast ratio. A wide range of contrast ratios (i.e., wide range of edge conditions) can be tolerated during operation. The center of the beam is used to find the edge of the sample since most of the center region of the beam is in the region of highest slope of the integrated power density (curve 23 of FIG. 2), and the differences of power densities across the edge have the greatest slopes or rates of change where high contrast ratios are present across the edge.

To determine whether an edge condition has been met the detector differential signal is compared with a reference signal. This reference can be "captured" in a variety of conventional analog, digital or hybrid "sample and hold" circuits. An acceptance "window" can be devised as a percentage of the reference level such that if the signal received from the sample part falls between the window limits, the edge condition is assumed to have been met. Variances in absolute laser beam power, sample surface reflectance, and electrical noise, as well as depth of focus sensitivity, make a fixed reference subject to failure in finding edges because of small variances in a less-than-average sample edge for use as a 'reference' edge. These problems can be overcome, for example, by using a reference which follows the same effects that change the strength of the reflected signal. This can be considered as "self-referencing" of the sample edge to the laser beam, (i.e., normalization), which maintains the edge-condition limits as a constant percentage of a floating reference.

The laser beam is configured to exhibit substantially Gaussian power density or intensity distribution across its width, and this characteristic is used to advantage according to the present invention by employing a beam detector, as illustrated in FIG. 4(a), which includes several active segments that are patterned and dimensioned relative to the dimensions of the laser beam. Specifically, the detector 41 includes a central active segment E43 which has a diameter that is substantially equal to that diameter 51 of the laser beam at which the condition of substantially one-half the spatially-integrated power is satisfied. This one-half-power dimension on the power-density distribution profile 21 of a laser beam is illustrated in FIG. 5(a). The remaining active segments A44, B45, C47, and D49 are arranged concentrically about the center segment E43 and within the outer diameter 53 of the laser beam. Opposite pairs of peripheral segments (A-C, B-D) are oriented in alignment with the X and Y axes of movement of the sample Part 9. Of course, these dimensions may be directly correlated or may be scaled up or down by suitable optical magnification. Where "out-of-focus" conditions exist, the power density distribution across the reflected beam may appear as illustrated in FIG. 4(b) where the diameter of the center segment E43 is less than the diameter of the laser beam at the half-power diameter thereof, as previously explained, and such condition will diminish edge sensitivity for reasons as later described herein.

As long as any one of the detector segments around the perimeter is fully illuminated before the edge condition is met, then the resulting signal level becomes a valid reference level. This will have an "in range to edge" level that is dependent upon the angle which the edge makes to the X or Y axis. With this scheme (using a single central segment), the difference between diametrically-opposed outer segment is used to lower or bias the signal from the central segment. This permits use of many well-known "zero crossing" techniques to determine when the edge condition is within given limits. For edges close to 45° from X or Y axes, 8 segments, around the perimeter rather than 4 can be used, and the largest differential between diametric opposite segments can be used as the reference in that case.

Figure 6:
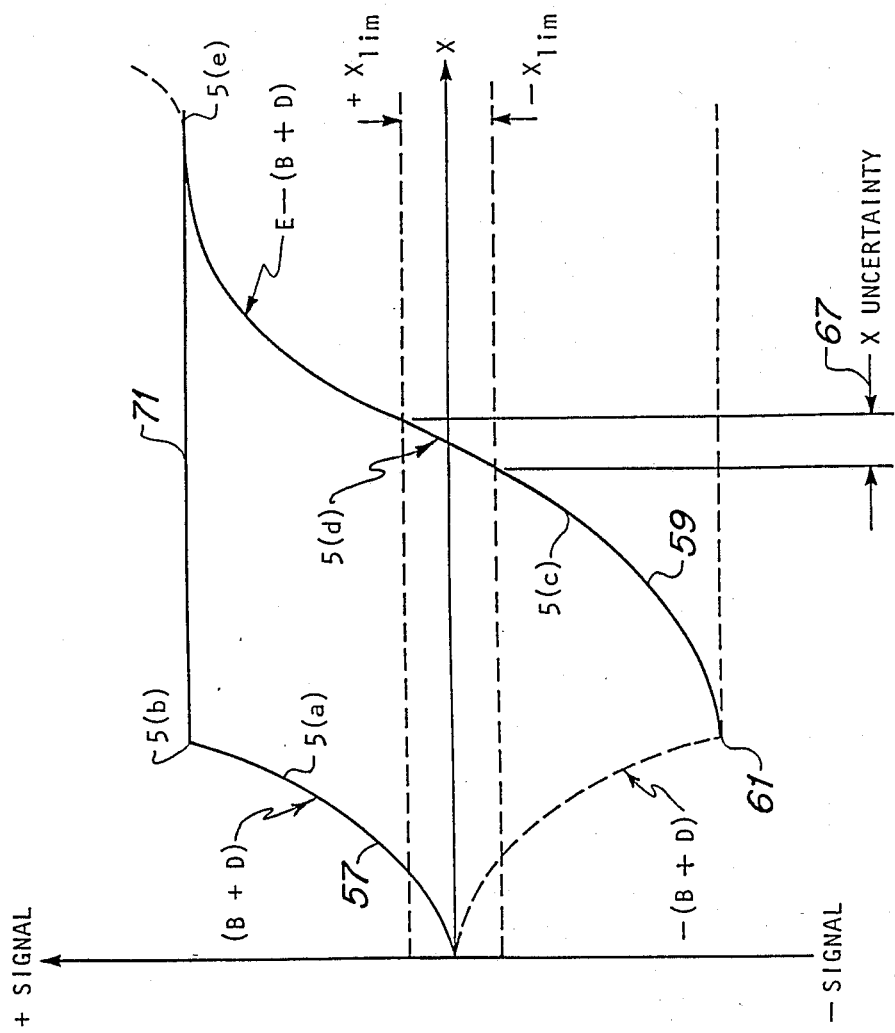
FIG. 6 is a graph illustrating the signal conditions attributable to the optical conditions illustrated in FIGS. 5(a) through (e)

In the preferred embodiment, the outer active segments A44, B45, C47, and D49 are oriented in quadrants around the center segment E43, and are angularly positioned so that opposite pairs of areas are substantially aligned with the orthogonal X and Y axes of relative movement of sample part and beam. Multi-segment detectors similar to detector 41 are described in the literature (see, for example, U.S. Pat. No. 3,435,232). Thus, as illustrated in FIGS. 5(a) through (e), a reflective sample part 9 supported on stage 19 to move along the X axis from left to right relative to the detector 41, causes left segment D49 to be illuminated initially as the right edge 55 of the sample part to be detected enters the field of view of the detector for reflections from the part 9. Of course, for transmission-mode of operation, the edge 55 to be detected may be considered to be the left edge of a part that is moving from left to right to expose the left segment D49 first. As the sample par 9 with edge 55 advances along the X axis, the illuminated area of active segment D (of conventional photo-responsive design) produces a signal that increases with distance traversed as more area of the active segment receives the reflected laser beam. The opposite-pair segment B aligned with segment D along the X axis will similarly produce increased output signal as its active area later receives the reflected laser beam. Thus, as illustrated by the curve 57 of FIG. 6, the summation of signals from segments B and D increases with distance moved by the part 9 along the X axis, until the entire active area of segment D is illuminated by the laser beam reflected from part 9, as shown in FIG. 5(b). Also, at about the position of part 9 illustrated in FIG. 5(b), central segment E begins to receive reflected laser beam to produce an output signal, as shown by curve 59 in FIG. 6. This signal may be combined with the inverse of the sum of signals from segment B and D to increase toward zero crossing from level 61. The signal gain, or weighting factor, for signal from segment E may be set at twice the gain for signals from segment A or B or C or D in order to establish the signal from exactly one-half of segment E under full illumination to be substantially equal to the signal from area D (or B) under full illumination. Alternatively, as previously described, the dimensions of the active segments may be selected such that the output of Central Segment E is ½ of the total beam power, or ½ of the combined output of A+B+C+D fully illuminated. Therefore, the combined signal of E−(B+D) illustrated by the curve 59 of FIG. 6 represents the integral (from level 61) of the reflected detected laser beam power with distance of the edge 55 moving across the area of segment E. When the edge 55 is centered on segment E, as illustrated in FIG. 5(d), the signal from segment E equals the inverse signal from segment D to provide a zero-level crossing at maximum rate of change (or slope of signal with distance moved by the edge 55. Segment B may be sending background illumination which can reduce detectable contrast, so the contained signals from segments B+D is used as the reference condition along the X-axis direction. Suitable zero-crossing detection circuits of conventional design may be used to produce an output upon zero-crossing of the signal E−(B+D), within the narrow limits 63 of noise signals or selected limit signals about zero level, as an indication of the precise alignment of the edge 55 at the position of exact center of segment E, as shown in FIG. 5(d). (Some positional uncertainty 67 is associated with the combined signal represented by curve 59 crossing 'zero' level within the range of zero-level limits 63). As the edge 55 of part 9 moves beyond the center of segment E, as illustrated in FIG. 5(e), the combined signal (B+D) of curve 57 in FIG. 6 increases from level 71 as the segment B receives reflected laser beam and contributes signal that is combined with signal from segment D. The position detection of edge 55 is therefore substantially symmetrical, allowing the edge to be detected during movement from left to right, or from right to left, whether in reflective or transmissive mode. Additionally, it should be noted that the same analysis as described above with reference to movement of an edge along the X axis, applies for edges detected during movement along the Y axis from top to bottom, or from bottom to top in line with the orientation of segments A and C. Therefore, the same detector 41 may be used to detect left or right edges as well as upper and lower edges. Using a laser beam of 1 millimeter diameter and optical magnification of ten, and objective lens magnification of ten, positional sensitivity of approximately 1/10 to 1/20 of a spot diameter yields edge-detection sensitivity, according to the present invention of about 1 micron of movement.

Figure 7:
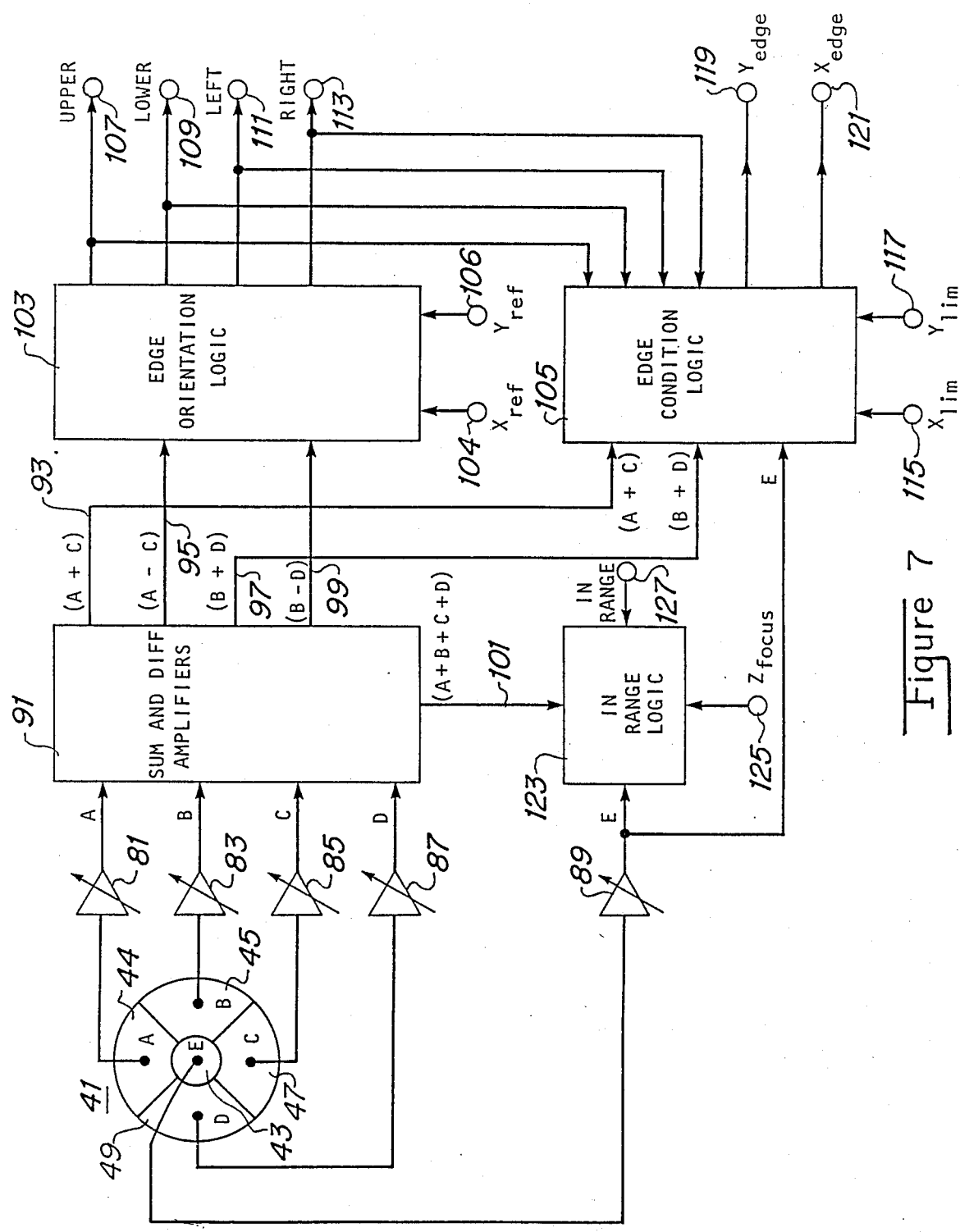
FIG. 7 is a block schematic diagram of the circuitry according to one embodiment of the invention for detecting the edge of the sample part.

Referring now to FIG. 7, there is shown a block schematic diagram of circuitry for operation according to the present invention. Amplifiers 81–89 are connected to receive the signals from the segments A–E, respectively, of the detector 41 and are set with equal gains amplifiers 81-87 and with twice such gain in amplifier 89 for reasons as previously discussed with reference to FIGS. 5 and 6. Alternatively, equal gains may be applied to signals derived from segments that are sized to integrate, in the central segment, twice the beam power of an outer segment when fully illuminated. The amplified signals are supplied to the inputs of the sum-and-difference amplifier 91 to yield the selected outputs (A+C) 93, (A−C) 95, (B+D) 97, (B−D) 99, and (A+B+C+D) 101. The outputs 95 and 99 are applied to the edge orientation logic circuit 103, and the outputs 93 and 97 are applied to the edge condition logic circuit 105. The edge orientation logic circuit receives X reference and Y reference signals 104, 106 and may include conventional analog logic circuitry for producing outputs 107, 109, 111, and 113 indicative of upper, lower, left, and right edges, respectively, according to the following logic conditions:

If (B−D) ≧ −$X_{ref}$, then "Left" edge output 107 (eq. 1)

If (B−D) ≦ +$X_{ref}$, then "Right" edge output 109 (eq. 2)

If (A−C) ≧ −$Y_{ref}$, then "Lower" edge output 111 (eq. 3)

If (A−C) ≦ +$Y_{ref}$, then "Upper" edge output 113 (eq. 4)

The edge condition logic 105 is connected to receive the outputs 107–113 from the edge orientation logic 103, and is also connected to receive X limit and Y limit input signals 115, 117, 93 (A+C), 97(B+D) and the amplified E-segment signal 89 to produce the X-edge and Y-edge outputs 119, 121 using conventional analog logic circuitry operating according to the following logic conditions:

$\frac{1}{2}X = E-(B+D)$ (eq. 5)

$\frac{1}{2}Y = E-(A+C)$ (eq. 6)

If $-X_{lim} \leq \frac{1}{2}X \leq +X_{lim}$, then "X" edge output 121 (eq. 7)

If $-Y_{lim} \leq \frac{1}{2}Y \leq +Y_{lim}$, then "Y" edge output 119 (eq. 8)

An in-range logic circuit 123 is connected to receive the amplified E-segment signal and a Z-focus input signal 125 and the summation output 101 from amplifier 91, and includes conventional analog logic circuitry operating to produce an in-range output 127 according to the following logic conditions:

$Z_{focus}$ = selected % of E (eq. 9)

If [(A+B+C+D)/2]E < Z (eq. 10)

then in-range output 127 is produced.

Figure 8:
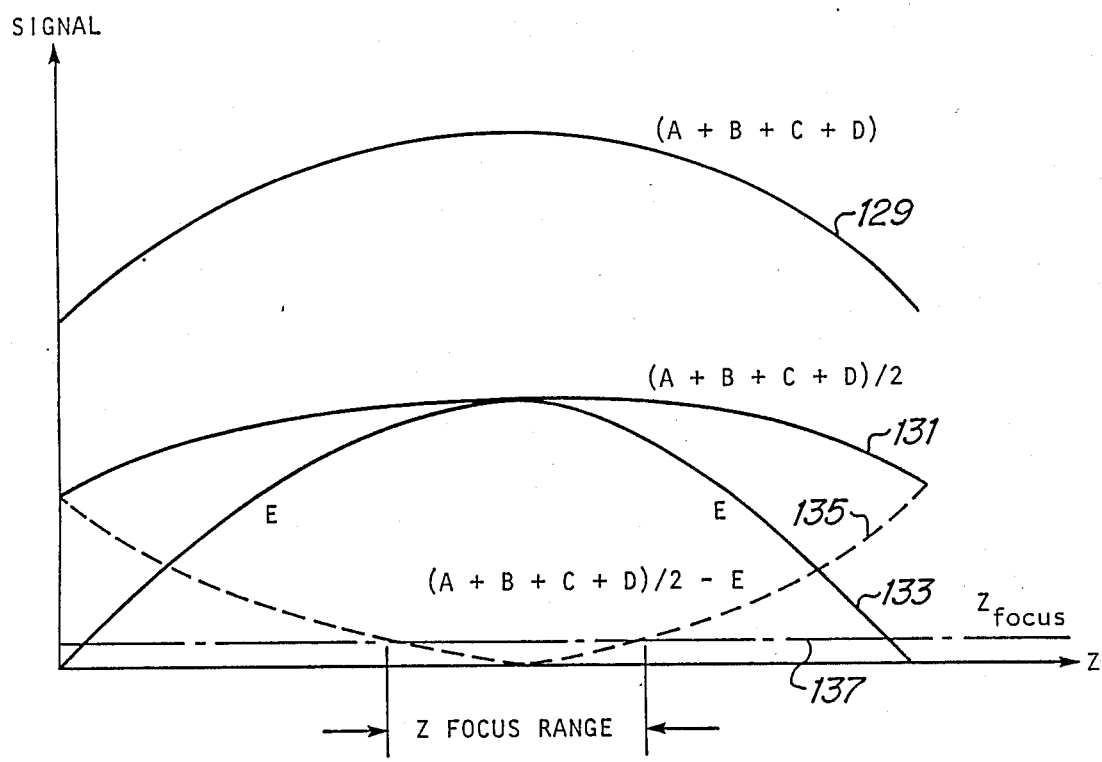
FIG. 8 is a graph illustrating the signal conditions in the operation of the circuitry of FIG. 7.

These operating conditions are illustrated in the graph of FIG. 8 which includes curve 129 that shows change in the level of summation signal 101 as the Z-axis distance between detector and source (or reflective part) varies. One-half the signal level of curve 129 is plotted as curve 131. Similarly, the values of E-segment signal 89 as a function of Z-axis spacing is plotted as curve 133. The curves 129, 131, and 133 exhibit peaks of amplitude in the central region as a result of the illumination pattern distributed over the areas of segments A through E of the detector, as illustrated in FIG. 4(b). Thus, from Equation 10 above, if one-half of the sum of A+B+C+D, plus the negative value of E (curve 135), is below the selected signal value of Z-focus 137, then the in-range signal 127 is produced to indicate that the optical system of FIG. 1 is properly positioned and focused relative to the sample part.

The edge-detection system of the embodiment of the present invention previously described relies upon the Gaussian distribution of light intensity or power density across a laser beam to provide accurate processing of analog signals indicative of the position of an edge of a sample part within the laser beam. Simple analog processing and logical analysis of signals from a multi-segment detector provide unambiguous indication of left or right, upper or lower edges of the sample part, with high positional accuracy as the part is moved through the laser beam aligned (either in reflective or transmissive mode) with the detector. High contrast ratios across the edge of the sample part provide greatest sensitivities to positional change across the laser beam to establish highly repeatable and highly accurate edge positional indications.

Figure 9:
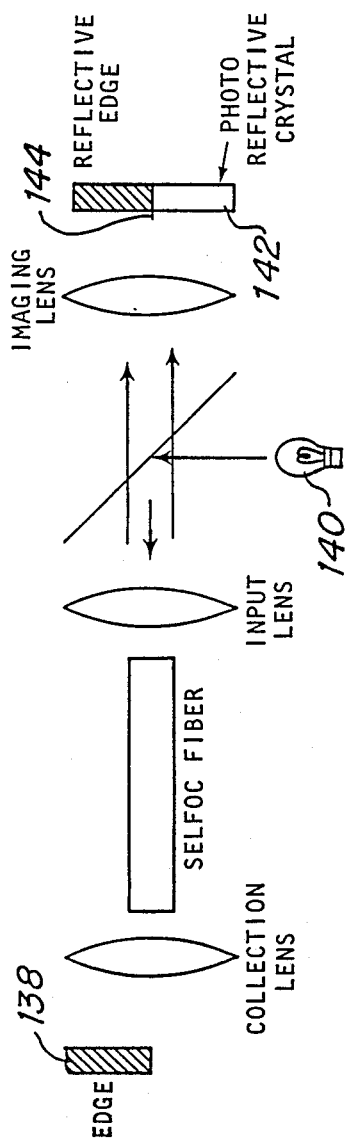
FIG. 9 is a pictorial diagram of apparatus for forming a reflective edge from the image of a sample part according to the invention.
Figure 13:
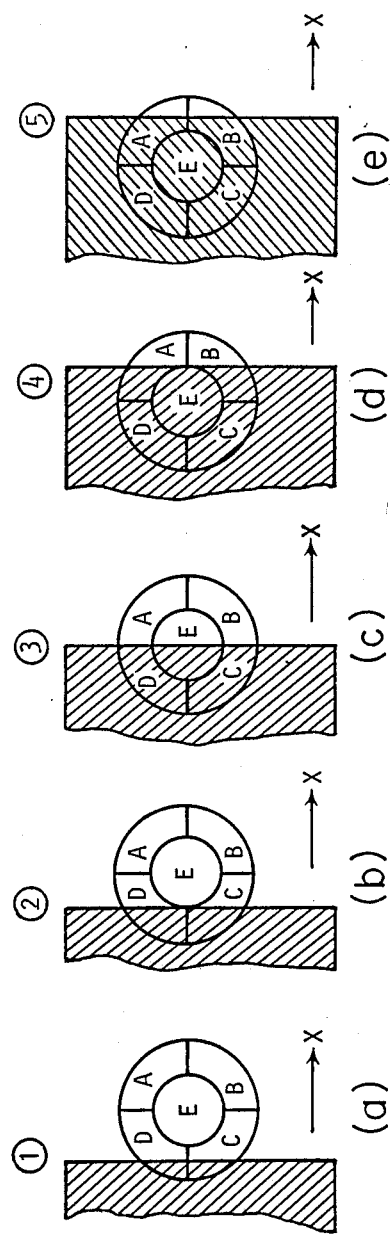
FIGS. 13(a) through (e) are diagrams of a detector according to the present invention illustrating a moving reflective edge variously positioned thereon.

For those applications in which the beam cannot be focused and reflected from a recessed surface, or where the only information about a sample part is the image and not the object itself (e.g., in the case of a comparator of profiles), then as illustrated in FIG. 9, a white-light source 140 may be used to project an image of the object onto a sheet 142 of photo-reflective material (such as photoconductor-coated lithium niobate) so that the image of an edge is converted to a real reflecting edge 144 on the photo-reflective crystal 142. With a real reflecting edge 144, it is possible to determine exactly when the edge (which can be maintained in fixed spatial orientation with respect to the object 138) is centered on the detector in accordance with the embodiments of the invention as previously described. In this operating mode of the present invention, long-distance sensing of an edge, or alignment of a laser with reference to an edge, may be accomplished using a microscope or borescope.

Because the detector configuration previously described is responsive to the amount of laser-beam power contained at or near the center of the laser beam relative to the power about the periphery of the beam, the detector configuration of the present invention can also be used to determine how close the edge of the object is to the focal point of the objective lens. In this operating mode, the beam power at the focal point is dominantly concentrated at the center of the beam, and this permits auto-focusing ($Z_{focus}$) of the optical system with respect to such $Z_{focus}$ reference condition to assure edge detection within the range of accuracy. This condition occurs, as illustrated in FIG. 8, when:

$$[(A+B+C+D)/2]-E-Z_{focus} \quad \text{(Eq. 10)}$$

In the geometries of detectors previously described, the orientation of a reflective edge at 45° with respect to the X and Y orthogonal axes yields an indeterminate condition of the power in the outer detectors equalling the power in the center detector. This uncertainty can be resolved in one embodiment of the present invention by forming orthogonally-oriented gaps 146 between outer segments of the detector, as illustrated in FIG. 10(a), or by forming a concentric, "bull's-eye" pattern of detector segments, as illustrated in the embodiment of FIG. 10(b). The detector of FIG. 10(a) collects less of the total power in the laser beam and thus is more susceptible to noise, for example, attributable to scattering from surface roughness. In the "bull s-eye" pattern of FIG. 10(b), substantially all of the laser-beam power is detected, but the response of the outer ring 148 does not completely plateau (154 in FIG. 10(c)) when the edge condition is met.

Another substantial limitation of the "bulls-eye" detector is that it has no edge angular orientation sensing capability, and it is not well suited for self-referencing or for quantifying the angular orientation of an edge at the moment of edge detection, as more fully explained later herein. In each of the illustrated embodiments of FIGS. 10(a) and (b), W is the diameter of the laser beam out to the dimension of the beam at which the intensity level equals $$\frac{I_0}{e'} \quad \text{(Eq. 11)}$$

where is the base of natural logarithms, $I_0$ is the maximum beam intensity at approximately the center, and the outer diameter d of the detector is approximately three times the beam width W.

In the detector embodiment illustrated in FIG. 10(a), the diameter of the center segment 150 is set at approximately 0.90 times W, and the beam power detected by center segment 150 is equal to 2 times the sum of the beam power detected by segments A, B, C or D. In the detector embodiment illustrated in FIG. 10(b), the diameter of the inner segment 152 is 1.18 times W such that the beam power detected by the inner segment 152 equals the beam power detected by the outer segment 148. The relative intensities of beam detected by the detector illustrated in FIG. 10(b) is illustrated in the graph of FIG. 10(c), and the differential intensities of beam detected by such detector is illustrated in the graph of FIG. 10(d). The primary reason for such a split or difference of relative intensities as the edge proceeds along the X-axis of the detector is because the distribution of the laser-beam power (or intensity) is centrally peaked. This greatly simplifies the edge sensing circuitry, and the focal condition can still be sensed, but the information about the edge orientation is lost.

It should be understood that the detector embodiments described above also work adequately well on beams of light with non-uniform intensity distribution over the beam width (for example, 'top-hat'-shaped distribution) with well-defined peripheral boundaries. Thus, if a source of a beam having non-Gaussian or incoherent power distribution (such as from a laser diode or light-emitting diode or even a white-light source), then good zero-crossing, edge-detection response is still achieved according to the present invention. To prevent the false edge detection at zero crossing within a beam of substantially uniform light intensity, the additional requirement is established that the detected light levels at either side of the edge have minimum differential. Otherwise, there would need to be an absolute zero-crossing range for each sample of reflectivity. Thus, if:

$$[(B-D)-(C+A)]> \pm V_{ref}, \text{ or} \quad \text{(Eq. 12)}$$

$$[(B-D)-(C-A)]> \pm V_{ref} \quad \text{(Eq. 13)}$$

then such conditions indicate a left/right or upper/-lower orientation of the detector relative to a significant edge, and not merely anomalous responses. And such conditions, in conjunction with a zero crossing, will validate an edge detection.

Referring now to FIG. 11, there is shown an embodiment of a detector according to the present invention in which the outer ring of the "bull's-eye" pattern is again segmented in quadrants A, B, C and D, with gaps therebetween oriented along the X and Y orthogonal axes. In this embodiment, progression of an edge across the detector with a non-orthogonal orientation yields a partial leveling 154 of the sum of the outer segments, as illustrated in the graph of FIG. 10(c), while progression of an edge across the detector with an orthogonal orientation yields a complete leveling 156 of the sum of the outer segments near edge crossing of the X or Y axis, as illustrated in the graph of FIG. 14. This embodiment of the present invention provides the advantages of generating information about angular orientation of the edge as well as using the entire beam power in the zero-crossing signals for less sensitivity to noise (for example, from surface-roughness scattering). The gaps between outer segments need only be about 0.005" for precision operation as described, as well as for ease of manufacture.

For improved angular precision, the detector may be formed on multiple levels with active Segments A and C fabricated on a plateau or mesa, say, above Segment E, and with Segments B and D fabricated on a plane (or planes) below Segment E to enable the edges of those active segments to be substantially vertically aligned and still be insulated from the adjacent segments.

At the edge-sense condition, the edge being detected effectively crosses through the detector origin (0,0). If Segment A is only partially illuminated at zero-crossing, then Segment D must be dark (or below some 'dark' level threshold value), and Segment E must be exactly one-half illuminated (i.e., the edge-sense definition). Under these conditions:

$$\frac{A}{(E/2)} = \frac{2A}{E} \quad \text{(Eq. 14)}$$

which represents an angular percentage of the 90° quadrant. Therefore, multiplying this value by 90 converts the percentage to degrees. Of course, similar considerations apply for sensing angular edge orientation within each of the four quadrants. For this angular information, the beam is considered rotationally symmetrical, and the first outer segment in a quadrant, as illustrated in FIG. 12, in which the edge appears is identified. Then, the percentage of one-half the response of central segment E by which such outer segment is illuminated at the edge condition provides the requisite information about angular orientation of the edge, as follows:

TABLE 1

| Quadrant | Segment | Angles | Requirement |
|---|---|---|---|
| QI | A | $0 \rightarrow (\pi/2)$ | $D \leq \min$ |
| QII | B | $(\pi/2) \rightarrow \pi$ | $C \leq \min$ |
| QIII | C | $\pi \rightarrow (3\pi/2)$ | $B \leq \min$ |
| QIV | D | $(3\pi/2) \rightarrow 2\pi$ | $A \leq \min$ |

Then, it can be shown that the angle through A is $$\theta A = \int_0^\theta \int_{r_i}^{r_0} rI_0 e^{-2(r^2/w^2)}\, dr\, d\theta = \frac{180A}{E} \quad \text{(Eq. 15)}$$

where r is the radius from inner to outer edge of the Segments A, B, C and D, and I? is the maximum beam intensity, and W is the beam width as previously described.

Given the above requirements and the conditions that if the edge is in a certain quadrant, then the illumination level in the next quadrant oriented counterclockwise from the certain quadrant is minimal because it is not aligned with the edge. Of course, the angle of orientation of an edge with respect to the other quadrants can also be similarly determined.

The operating conditions for edge detection are set forth in the following Table 2:

TABLE 2

| INPUTS | a, b, c, d, e (raw, unamplified detector signals |
|---|---|
| REFERENCE LEVELS | $V_z$ (in focus reference voltage) $\pm V_{ref}$ (edge orientation reference voltage) |
| INITIAL ALIGNMENT | (A + B + C + D) = E AND A = B = C = D while fully illuminated by a Gaussian beam profile |

CONDITIONALS

| | | | |
|---|---|---|---|
| (1) | (A + B + C + D) | SUM | (sum of outer elements) |
| (2) | SUM − E = 0 | ZERO | (zero-crossing detect) |
| (3) | [(D − B) + (C − A)] > + $V_{ref}$ | Ol | (left orientation) |
| (4) | [(D − B) + (C − A)] < − $V_{ref}$ | Or | (right orientation) |
| (5) | [(D − B) − (C − A)] > + $V_{ref}$ | Ou | (upper orientation) |
| (6) | [(D − B) − (C − A)] < − $V_{ref}$ | Od | (lower orientation) |
| (7) | (Ol OR Or) | Gx | (X-axis orientation gate) |
| (8) | (Ou OR Od) | Gy | (Y-axis orientation gate) |
| (9) | (Gx OR Gy) | Gxy | (any-axis orientation gate) |
| (10) | Gx AND ZERO | Tx | (X-axis edge trigger) |
| (11) | Gy AND ZERO | Ty | (Y-axis edge trigger) |
| (12) | Tx OR Ty → Txy | | (any-axis edge trigger) |
| (13) | [(A + B + C + D + E) > + $V_{ref}$ | F | (detector saturation sensing) |
| (14) | [(A + B + C + D) − E] < (Vz | F | (in-focus condition) |

I claim:

1. The method of detecting the edge of an object interposed in a beam of light having a non-uniform distribution of power density across the beam, the method comprising the steps of:

orienting the object for relative movement along an axis substantially orthogonal to the path of the beam for interrupting the beam initially at the periphery thereof;

detecting the relative intensities of the interrupted beam in a central sector and in at least four individual sectors which are oriented within orthogonal quadrants about said central sector for producing outputs representative of the interrupted beam in each of the sectors; and selectively combining the outputs of the individual sectors with the output of the central sector to provide a composite output that varies as a function of the position of the object within the beam along the axis of movement.

2. The method according to claim 1 wherein in the step of detecting, the portion of the interrupted beam that is reflected is detected in said plurality of sectors.

3. The method according to claim 1 wherein in the step of detecting, the portion of the beam that is transmitted past the object is detected in said plurality of sectors.

4. The method according to claim 1 wherein in the step of detecting, the portion of beam is detected in at least a pair of said sectors within orthogonal quadrants about an orthogonal axis that is substantially aligned with the axis of relative movement of the object;

and in the step of selectively combining, the summation of the outputs from said four individual sectors is combined with the inverse of the output from said central sector for providing a composite output that varies in relation to the position of the edge of the object within the beam, and an indication of the position of the edge of the object within the beam is produced in response to the condition of the composite output attaining substantially zero value and the difference of the outputs from at least a pair of said individual sectors that are oriented in diagonal orthogonal sectors exceeding a reference value.

5. The method according to claim 1 wherein in the step of detecting, the outer dimension of said four individual sectors is approximately equal to three times the dimension of the beam out to the position therein at which the intensity is reduced to approximately $1/e^2$ of the maximum intensity of the beam, where e is the base of the natural logarithm.

6. The method according to claim 5 wherein in the step of detecting, the dimensions of the central sector is approximately equal to 0.9 to 1.2 times the dimension of the beam out to the position therein at which the intensity is reduced to approximately $1/e^2$ of the maximum intensity of the beam, where e is the base of the natural logarithm.

7. Object detection apparatus comprising:
source means producing an output beam of radiation having non-uniform distribution of intensity thereacross;
means supporting the object for relative movement along an axis substantially orthogonal to the path of the beam for interrupting the beam initially at the periphery thereof;
detector means disposed to detect the relative intensities of the interrupted beam in at least four individual sectors which are oriented in orthogonal quadrants about a central sector for producing outputs representative of the intensity of the interrupted beam at each such sector thereof;
circuit means connected to receive the outputs for additively combining the outputs of the four sectors and for subtracting therefrom the output of the central sector to provide a composite output that attains substantially zero value as an indication of the position of the object within the beam along the axis of movement.

8. Object detection apparatus as in claim 7 wherein said detector means is disposed to detect the portion of the altered beam reflected by the object.

9. Object detection apparatus as in claim 7 wherein said detector means is disposed to detect the portion of the altered beam transmitted past the object.

10. Object detection apparatus as in claim 7 wherein said means supporting the object is disposed to provide relative movement of the object with respect to the beam along orthogonal axes within a plane substantially orthogonal to the beam;
at least a pair of said individual sectors of said detector means are oriented within orthogonal quadrants about an orthogonal axis which is substantially aligned with the axis of relative movement of the object to produce outputs indicative of the base intensity detected thereby; and
said circuit means sums the outputs from said four individual sectors with the inverse of the output from said central sector to produce a composite signal for providing an indication of the position of the edge of the object within the beam in response to the condition of the composite signal attaining substantially zero value and the difference of outputs from at least a pair of said individual sectors that are oriented in diagonal orthogonal sectors exceeding a reference value.

11. Object detection apparatus as in claim 7 wherein the outer dimension of said four individual sectors of said detector means is approximately equal to three times the dimension of the beam out to the position therein at which the intensity is reduced to approximately $1/e^2$ of the maximum intensity of the beam, where e is the base of the natural logarithm.

12. Object detection apparatus as in claim 7 wherein the dimensions of the central sector of said detector means is approximately equal to 0.9 to 1.2 times the dimension of the beam out to the position therein at which the intensity is reduced to approximately $1/e^2$ of the maximum intensity of the beam, where e is the base of the natural logarithm.

13. The method of detecting the edge of an object interposed in a beam of light having a non-uniform distribution of power density across the beam, the method comprising the steps of:
orienting the object for relative movement along an axis substantially orthogonal to the path of the beam for interrupting the beam initially at the periphery thereof;
detecting the relative intensities of the interrupted beam in a central sector and in a peripheral sector oriented about said central sector for producing outputs of said sectors representative of the interrupted beam; and
sensing the difference of said outputs to provide a composite output that indicates the position of the object within the beam along the axis of movement in response to the composite output attaining substantially zero value.

14. The method according to claim 13 wherein in the step of detecting, the outer dimension of said peripheral sector is approximately equal to three times the dimension of the beam out to the position therein at which the intensity is reduced to approximately $1/e^2$ of the maximum intensity of the beam, where e is the base of the natural logarithm.

15. The method according to claim 14 wherein in the step of detecting, the dimensions of the central sector is approximately equal to 0.4 times the outer dimension of said peripheral sector.

16. Object detection apparatus comprising:
source means producing an output beam of radiation having non-uniform distribution of density thereacross;
means supporting the object for relative movement along an axis substantially orthogonal to the path of the beam for interrupting the beam initially at the periphery thereof;
detector means disposed to detect the relative intensities of the interrupted beam in a central sector and in a peripheral sector oriented about said central sector for producing outputs representative of the intensity of the interrupted beam at each such sector thereof;
circuit means connected to receive the outputs for producing an output indicative of the difference of the outputs of said sectors to provide an indication of the position of the object within the beam along the axis of movement.

17. Object detection apparatus as in claim 16 wherein the outer dimension of said peripheral sector of said detector means is approximately equal to three times the dimension of the beam out to the position therein at which the intensity is reduced to approximately $1/e^2$ of the maximum intensity of the beam, where e is the base of the natural logarithm.

18. Object detection apparatus as in claim 17 wherein the dimensions of the central sector of said detector means is approximately equal to 0.4 times the outer dimension of said peripheral sector.

* * * * *